US008108673B2

(12) United States Patent
Frazier et al.

(10) Patent No.: US 8,108,673 B2
(45) Date of Patent: Jan. 31, 2012

(54) CONFIGURING INTERFACES OF A SWITCH USING TEMPLATES

(75) Inventors: Jason D. Frazier, Raleigh, NC (US); Ramesh V N Ponnapalli, Bangalore (IN); Shyam Kaluve, Bangalore (IN); Rajasekhar Manam, Bangalore (IN); Jacob F. Jensen, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1238 days.

(21) Appl. No.: 11/119,244

(22) Filed: Apr. 29, 2005

(65) Prior Publication Data
US 2006/0248335 A1  Nov. 2, 2006

(51) Int. Cl.
*H04L 9/32* (2006.01)
(52) U.S. Cl. .......................... 713/168; 709/220
(58) Field of Classification Search .......... 370/254–256, 370/218, 355–357; 726/2–7; 713/168, 170, 713/153, 155
See application file for complete search history.

(56) References Cited

U.S. PATENT DOCUMENTS

| | | | | | |
|---|---|---|---|---|---|
| 4,872,158 | A | * | 10/1989 | Richards | 370/380 |
| 5,274,631 | A | * | 12/1993 | Bhardwaj | 370/401 |
| 5,515,376 | A | * | 5/1996 | Murthy et al. | 370/402 |
| 5,818,842 | A | * | 10/1998 | Burwell et al. | 370/397 |
| 5,867,787 | A | * | 2/1999 | Vudali et al. | 455/445 |
| 5,926,463 | A | * | 7/1999 | Ahearn et al. | 370/254 |
| 6,151,499 | A | * | 11/2000 | Vudali et al. | 455/433 |
| 6,408,061 | B1 | * | 6/2002 | Donak et al. | 379/188 |
| 6,683,941 | B2 | * | 1/2004 | Brown et al. | 379/88.22 |
| 7,283,476 | B2 | * | 10/2007 | Bare | 370/236 |
| 7,340,519 | B1 | * | 3/2008 | Golan et al. | 709/225 |
| 7,379,857 | B2 | * | 5/2008 | Piesco | 703/21 |
| 7,447,147 | B2 | * | 11/2008 | Nguyen et al. | 370/216 |
| 7,526,536 | B2 | * | 4/2009 | Bhogal et al. | 709/220 |
| 2003/0205250 | A1 | * | 11/2003 | DeBoer et al. | 134/57 D |
| 2004/0081144 | A1 | * | 4/2004 | Martin et al. | 370/360 |
| 2005/0243737 | A1 | * | 11/2005 | Dooley et al. | 370/254 |
| 2005/0254438 | A1 | * | 11/2005 | Turk et al. | 370/254 |
| 2006/0114839 | A1 | * | 6/2006 | Meier et al. | 370/254 |
| 2006/0212547 | A1 | * | 9/2006 | Deleu et al. | 709/220 |
| 2006/0230280 | A1 | * | 10/2006 | Zimmer et al. | 713/182 |
| 2008/0037528 | A1 | * | 2/2008 | Lindeijer et al. | 370/354 |

OTHER PUBLICATIONS

Congdon, P., et al., "*IEEE 802.1X Remote Authentication Dial in User Service (RADIUS) Usage Guidelines*", Network Working Group, Request for Comments: 3580, Category: Informational, 30 pages, Sep. 2003.
"*Comparison of the Cisco Catalyst and Cisco IOS Operating Systems for the Cisco Catalyst 6500 Series Switch*", White Paper, Cisco Systems, Inc., Copyright © 2004 Cisco Systems, Inc., www.cisco.com, 52 pages, 2004.

* cited by examiner

*Primary Examiner* — Kambiz Zand
*Assistant Examiner* — Dant Shaifer Harriman
(74) *Attorney, Agent, or Firm* — Baker Botts L.L.P.

(57) ABSTRACT

Configuring an interface of a switch includes sending an authentication request requesting authentication for an endpoint from a switch to an authentication server. The switch comprises interfaces and is operable to access templates, where a template is operable to generate one or more interface commands for an interface. An instruction is received from the authentication server. The instruction instructs the switch to apply an identified template to an interface, where the identified template is identified by the authentication server as associated with the endpoint. The identified template is applied to configure the interface according to the instruction.

25 Claims, 2 Drawing Sheets

CONFIGURING INTERFACES OF A SWITCH USING TEMPLATES

TECHNICAL FIELD

This invention relates generally to the field of telecommunications and more specifically to configuring interfaces of a switch using templates.

BACKGROUND

A switch of a communication network has interfaces that send and receive packets in order to route the packets among devices of the network. An interface may be configured to communicate packets to and from a particular endpoint. Known techniques of configuring interfaces of a switch involve manually sending instructions to the switch. These known techniques, however, are inconvenient in certain situations. Convenient techniques for configuring interfaces may be useful in certain situations.

SUMMARY OF THE DISCLOSURE

In accordance with the present invention, disadvantages and problems associated with previous techniques for configuring interfaces of a switch may be reduced or eliminated.

According to one embodiment of the present invention, configuring an interface of a switch includes sending an authentication request requesting authentication for an endpoint from a switch to an authentication server. The switch comprises interfaces and is operable to access templates, where a template is operable to generate one or more interface commands for an interface. An instruction is received from the authentication server. The instruction instructs the switch to apply an identified template to an interface, where the identified template is identified by the authentication server as associated with the endpoint. The identified template is applied to configure the interface according to the instruction.

Certain embodiments of the invention may provide one or more technical advantages. A technical advantage of one embodiment may be that a template may be used to configure an interface of the switch. The template may be generated prior to configuration and used multiple times. The switch may apply the template to configure the interface, which may provide for convenient configuration.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
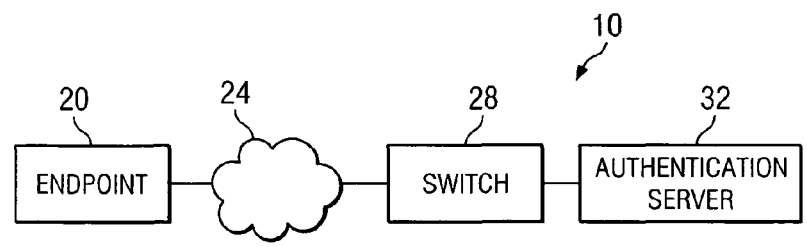
FIG. 1 is a block diagram illustrating one embodiment of a system that may be used to configure interfaces of a switch.
Figure 2:
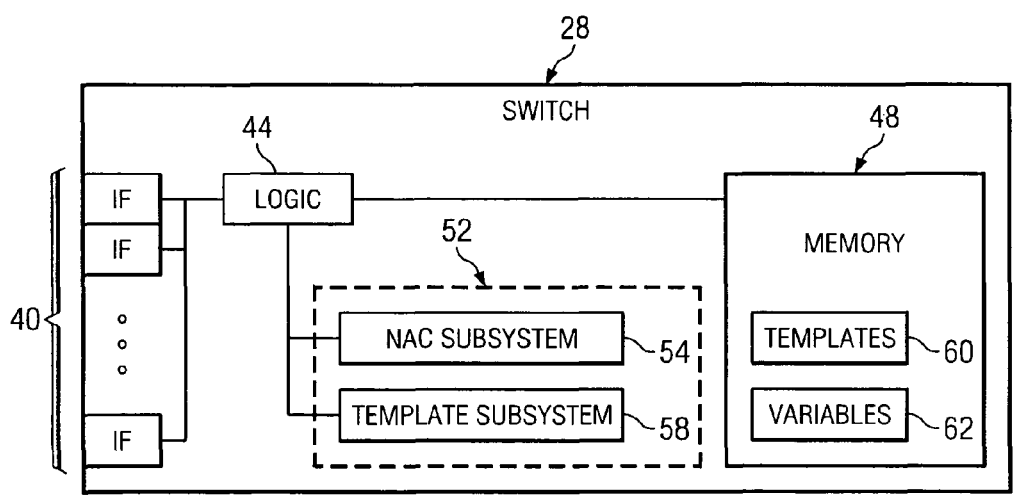
FIG. 2 is a block diagram illustrating one embodiment of the switch of the system of FIG. 1.
Figure 3:
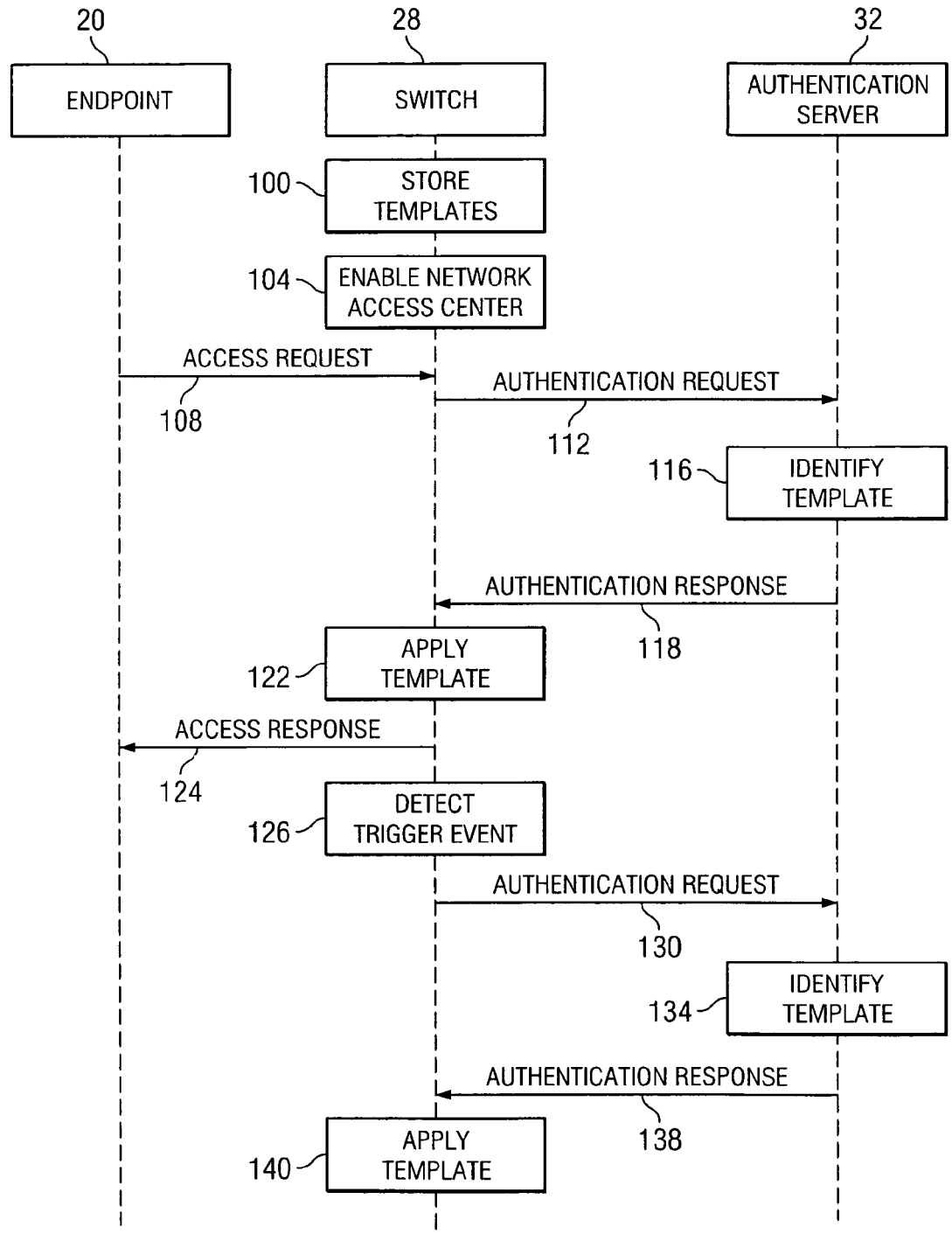
FIG. 3 is a flowchart illustrating one embodiment of a method for configuring the switch of the system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system that may be used to configure interfaces of a switch. A system 10 includes an endpoint 20, a communication network 24, a switch 28, and an authentication server 32. In general, endpoint 20 sends an authentication request to switch 28, which forwards the request to authentication server 32. Authentication server 32 instructs switch 28 to apply a specific template to an interface of switch 28 in order to configure the interface for endpoint 20.

According to the embodiment, system 10 may communicate packets among the devices of system 10. "Packet" may refer to a bundle of data organized in a specific way for transmission, and a frame may comprise the payload of one or more packets organized in a specific way for transmission. A packet may carry any suitable information such as audio, video, data, multimedia, control messages, other information, or any combination of the preceding. For example, packets may carry the Institute of Electrical and Electronics Engineers, Inc. (IEEE) 802 media, such as Ethernet, token ring, or wireless local area network (LAN) media.

Endpoint 20 may represent a user or a device operable to communicate with switch 28 through communication network 24. An endpoint 20 may have an endpoint identifier that uniquely identifies endpoint 20, and may be associated with an endpoint profile that describes endpoint 20. An endpoint 20 may be of a specific endpoint type, which may be used to determine what type of configuration may be used to configure an interface for endpoint 20.

As an example, an endpoint 20 may represent a user, which in turn may refer to a user profile representing a person. The user profile may comprise, for example, a user address, a user passcode, a user name, other user information, or any combination of the preceding. A user may have a user identifier that uniquely identifies the user.

As another example, an endpoint 20 may represent a device that comprises any hardware, software, firmware, or combination thereof operable to communicate with switch 28 through communication network 24. For example, endpoint 20 may represent a computer, a switch, a personal digital assistant, a cellular telephone, or any other device suitable for communicating data packets to and from communication network 24. The device may support Internet Protocol (IP) or other suitable communication protocol, and may include a medium access control (MAC) and a physical layer (PHY) interface that conforms to IEEE 801.11. A device may have a device identifier such as the MAC address the device, and may have a device profile that describes the device.

Communication network 24 may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Switch 28 selects communication paths to route packets, and may comprise a link-by-link switch or a end-to-end router. Switch 28 receives a packet and determines the destination of the packet. A transmission path is established based on the destination. The path may be established by configuring incoming and outgoing interfaces of switch 28.

According to one embodiment, switch 28 may include templates that may be applied to the interfaces of switch 28 to configure the interfaces. Switch 28 may apply a template in response to an instruction from authentication server 32. Switch 28 is described in more detail with reference to FIG. 2.

Authentication server 32 authenticates endpoints 20, and may comprise a remote authentication dial-in user service (RADIUS) server. Authentication may be performed according to the IEEE 802.1X procedure. Authentication server 32 may manage the administration of profiles maintained at an authentication database, and may authenticate an endpoint 20 using the profiles. Any suitable information may be required to authenticate an endpoint 20. For example, a user identifier and a user posture may be required. Authentication server 32 may also provide other services, for example, authorization, accounting, or both.

According to one embodiment, authentication server 32 may instruct switch 28 to apply a specific template to an interface to configure the interface. Authentication server 32 may provide instructions to switch 28 in any suitable manner. For example, authentication server 32 may send a tag that includes the template identifier of the template to be applied.

Authentication server 32 may have access to a table that associates endpoints 20 with specific templates. Accordingly, authentication server 32 may determine the template associated with the endpoint 20 using the table. An endpoint 20 may be associated with a template in any suitable manner. As an example, an endpoint identifier of the endpoint 20 may be associated with a template identifier of the template. As another example, an endpoint type of the endpoint 20 may be associated with a template identifier of the template.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of switch 28 and authentication server 32 may be performed by one device, or the operations of switch 28 may be performed by more than one device. Additionally, operations of system 10 may be performed using any suitable logic comprising software, hardware, other logic, or any suitable combination of the preceding. As used in this document, "each" refers to each member of a set or each member of a subset of a set.

FIG. 2 is a block diagram illustrating one embodiment of the switch of the system of FIG. 1. According to the illustrated embodiment, switch 28 includes interfaces (IFs) 40, a logic 44, a memory 48, and one or more subsystems 52 coupled as shown. Interfaces 40 receive and send packets. "Interface" may refer to any suitable structure of a device operable to receive input for the device, send output from the device, or both, and may comprise one or more ports. An interface may be identified by an interface identifier such as a port identifier.

Logic 44 manages the operation of switch 28, and may comprise any suitable hardware, software, or combination of hardware and software. For example, logic 44 may include a processor. "Processor" may refer to any suitable device operable to execute instructions and manipulate data to perform operations.

Memory 48 stores and facilitates retrieval of information used by logic 44. "Memory" may refer to any structure operable to store and facilitate retrieval of information, and may comprise Random Access Memory (RAM), Read Only Memory (ROM), magnetic drives, disk drives, Compact Disk (CD) Drives, Digital Video Disk (DVD) drives, removable media storage, any other suitable data storage device, or any combination of any of the preceding.

According to the illustrated embodiment, memory 48 stores interface templates 60 and variables 62. An interface template 50 may represent a template that may be used to generate interface commands. An interface command may represent a command used to configure an interface 40. The interface command may specify a setting for an interface feature such as a port configuration feature. Example features include a port assignment, port trust, port membership, port enable, port security, inline power, discovery protocol assignment, virtual local area network (VLAN) assignment, Uni-Directional Link Detection (UDLD) setting, quality of service, policing, or other suitable feature. According to one embodiment, an interface template 50 may be defined on switch 28 by a user using a command line interface (CLI).

A port assignment may represent the assignment of an interface to an endpoint 20 or other device of system 10. As example, network 14 may be assigned to a port 40 of switch 28. A port trust setting may represent a designation of whether a port is trusted or untrusted. An interface 40 may be trusted if data received through interface 40 has been authenticated, authorized, or both authenticated and authorized.

A template may include template commands that may be used to generate interface commands. A template command may include variables 62 for which values may be specified to create an interface command. Different values may be specified in order to create different interface commands. Variables 62 may refer to any suitable parameters that may be used to configure an interface 40. For example, variables 62 may include an IP address, a medium access control (MAC) address, a domain named server (DNS) identifier, a session timer, a status query timeout, a VLAN identifier, an access control list (ACL), a universal resource locator (URL) redirect, an encryption key, other variable, or any combination of the preceding. A variable 62 may be defined globally or for a particular interface 40.

As an example, an auxiliary network template command may have an auxiliary network variable. According to the example, the auxiliary network template command may be used to configure an auxiliary network, such as a virtual local area network (VLAN), for an interface 40. The template command may be used to configure a first set of ports and a second set of ports. A first value may be specified for the auxiliary network variable for the first set of ports, and a second value may be specified for the auxiliary network variable for the second set of ports.

A value may be defined for a variable 62 at any suitable time. A predefined variable may represent a variable 62 that is defined at switch 28 prior to the application of the template. When the template is applied, switch 28 may obtain the value of the predefined variable from a local database and substitute the value for the predefined variable. A reserved variable may represent a variable 62 that is not defined to switch 28 prior to application of the template. The value of the reserved variable is not stored at switch 28, and is defined at the time of application. When the template is applied, switch 28 may obtain the value from another device and substitute the value for the reserved variable.

Template 60 may represent any suitable interface template. An example of a template 60 may include an endpoint authentication template that may be used to generate an endpoint authentication command. The endpoint authentication command may allow an authenticated endpoint 20 to use an interface 40. Endpoint 20 may be authenticated by an endpoint identifier such as an endpoint IP address. After the endpoint 20 has been authenticated, the endpoint identifier and the interface identifier may be inserted into the template to generate the command.

Other example templates 60 include an add endpoint template and a remove endpoint template. An add endpoint template may be used to add an endpoint, such as a user, to switch

28. A remove endpoint template may be used to remove an endpoint, such as a user, from switch 28. The templates may be specified for specific types of users. For example, an add healthy engineer and remove healthy engineer templates may be defined.

According to the illustrated embodiment, subsystems 52 include a network access center (NAC) subsystem 54 and a template subsystem 58. Network access center subsystem 54 operates as a client for authentication server 32, and receives instructions from authentication server 32. Template subsystem 58 receives instructions from network access center subsystem 54, determines a template and interface 40 from the instructions, and applies the template to configure the interface 40. A template may be applied by identifying a parameter to be configured, determining the setting for the parameter, and inserting the setting into the parameter.

Modifications, additions, or omissions may be made to switch 28 without departing from the scope of the invention. The components of switch 28 may be integrated or separated according to particular needs. Moreover, the operations of switch 28 may be performed by more, fewer, or other modules. For example, the operations of NAC subsystem 54 and template subsystem 58 may be performed by one module, or the operations of template subsystem 58 may be performed by more than one module. Additionally, the operations of switch 28 may be performed using any suitable logic comprising software, hardware, other logic, or any suitable combination of the preceding.

FIG. 3 is a flowchart illustrating one embodiment of a method for configuring interfaces of a switch. The method begins at step 100, where templates 50 are stored at switch 28. Templates may be defined by a user and stored at switch 28. Network access center subsystem 54 is enabled at step 104. A default tag may be applied to interface 40 as network access center subsystem 54 is enabled.

Endpoint 20 sends an access request at step 108. An access request may represent a message requesting access to switch 28. The access request may include user information such as a user identifier, a user passcode, or both. Switch 28 sends an authentication request to authentication server 32 at step 112. An authentication request may represent a message requesting authentication of endpoint 20. Authentication may be requested in response to the expiration of an authentication timer or in response to an explicit request by management action. The authentication request may include at least a portion of the user information.

Authentication server 32 identifies a template associated with the user information at step 116. The template may be identified using a table that associates the user identifier with template identifier. Authentication server 32 sends an authentication response at step 118. The authentication response includes the template identifier of the identified template. The identified template may comprise an accept user template or a deny user template. The response may also include identifiers for an add user template and a remove user template. Switch 28 stores the identifiers.

Switch 28 applies the template identified by the template identifier at step 122. For example, NAC subsystem 54 may instruct template subsystem 58 to apply the identified template. If multiple authentication requests are being processed, NAC subsystem 54 may synchronize the requests. According to one embodiment, switch 28 may apply a default tag for each interface 40 for which an identified tag is not being applied. An access response is sent to endpoint 20 at step 124.

Switch 28 detects a trigger event at step 126. The trigger event triggers a next authentication process. As an example, a trigger event may comprise a session timeout, a reauthorization request, a posture change of user, or other event. In response to a trigger event, switch 28 may apply a remove user template to the interface 40.

Switch 28 sends an authentication request to authentication server 32 at step 130. The authentication request includes a description of the trigger event. Authentication server 32 identifies a template associated with the trigger event at step 134. Authentication server 32 sends a response at step 138. The response includes the template identifier of the template. Switch 28 applies the template identified by the template identifier at step 140. After applying the template, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a template may be used to configure an interface of the switch. The template may be generated prior to configuration and used multiple times. The switch may apply the template to configure the interface, which may provide for convenient configuration.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for configuring an interface of a switch, comprising:
    sending an authentication request from a switch to an authentication server, the authentication request requesting authentication for an endpoint, the switch comprising a plurality of interfaces and operable to access a plurality of templates, a template of the plurality of templates operable to generate one or more interface commands for an interface of the plurality of interfaces;
    receiving a template identifier of a template identified by the authentication server as corresponding to an endpoint type of the endpoint, the template configured to be used to generate an interface command that allows the endpoint to use an interface of the switch;
    receiving an instruction from the authentication server, the instruction instructing the switch to apply the identified template to an interface of the plurality of interfaces, the identified template identified by the authentication server as associated with the endpoint;
    inserting, by the switch, an endpoint device identifier of the endpoint and an interface identifier of the interface into the template in response to the instruction from the authentication server in order to generate the command to allow the endpoint to use the interface, the endpoint device identifier comprising an endpoint IP address that uniquely identifies the endpoint, the endpoint device identifier identifying the endpoint type; and
    applying, by the switch, the identified template to configure the interface according to the instruction.

2. The method of claim 1, wherein applying the identified template to configure the interface further comprises:
    determining an interface command of the identified template; and
    applying the interface command to the interface.

3. The method of claim 1, wherein applying the identified template to configure the interface further comprises:
  identifying a variable of a template command of the identified template;
  establishing a value for the variable;
  inserting the value for the variable to yield an interface command; and
  applying the interface command to the interface.

4. The method of claim 1, further comprising:
  detecting a trigger event that triggers a next authentication request;
  sending the next authentication request in response to detecting the trigger event; and
  applying a remove endpoint template to the interface in response to detecting the trigger event.

5. The method of claim 1, wherein:
  receiving an instruction from the authentication server further comprises receiving the instruction instructing the switch to apply the identified template comprising an add endpoint template, the add endpoint template operable to add the endpoint to the switch; and
  applying the identified template to configure the interface further comprises adding the endpoint to the switch.

6. The method of claim 1, wherein:
  receiving an instruction from the authentication server further comprises receiving the instruction instructing the switch to apply the identified template comprising a remove endpoint template, the remove endpoint template operable to remove the endpoint from the switch; and
  applying the identified template to configure the interface further comprises removing the endpoint from the switch.

7. A switch for communicating a plurality of packets, comprising:
  a plurality of interfaces operable to send a packet and to receive a packet;
  a memory operable to store a plurality of templates, a template of the plurality of templates operable to generate one or more interface commands for an interface of the plurality of interfaces; and
  logic coupled to the plurality of interfaces and to the memory, the logic operable to:
    send an authentication request to an authentication server, the authentication request requesting authentication, the authentication server identifying a template that corresponds to an endpoint type of the endpoint, the template configured to be used to generate an interface command that allows the endpoint to use an interface of the switch;
    receive an instruction from the authentication server, the instruction instructing the switch to apply the identified template to an interface of the plurality of interfaces, the identified template identified by the authentication server as associated with the endpoint;
    insert, by the switch, an endpoint device identifier of the endpoint and an interface identifier of the interface into the template in response to the instruction from the authentication server in order to generate the command to allow the endpoint to use the interface, the endpoint device identifier comprising an endpoint IP address that uniquely identifies the endpoint, the endpoint device identifier identifying the endpoint type; and
    apply, by the switch, the identified template to configure the interface according to the instruction.

8. The switch of claim 7, the logic further operable to apply the identified template to configure the interface by:
  determining an interface command of the identified template; and
  applying the interface command to the interface.

9. The switch of claim 7, the logic further operable to apply the identified template to configure the interface by:
  identifying a variable of a template command of the identified template;
  establishing a value for the variable;
  inserting the value for the variable to yield an interface command; and
  applying the interface command to the interface.

10. The switch of claim 7, the logic further operable to:
  detect a trigger event that triggers a next authentication request;
  send the next authentication request in response to detecting the trigger event; and
  apply a remove endpoint template to the interface in response to detecting the trigger event.

11. The switch of claim 7, the logic further operable to:
  receive an instruction from the authentication server by receiving the instruction instructing the switch to apply the identified template comprising an add endpoint template, the add endpoint template operable to add the endpoint to the switch; and
  apply the identified template to configure the interface by adding the endpoint to the switch.

12. The switch of claim 7, the logic further operable to:
  receive an instruction from the authentication server by receiving the instruction instructing the switch to apply the identified template comprising a remove endpoint template, the remove endpoint template operable to remove the endpoint from the switch; and
  apply the identified template to configure the interface by removing the endpoint from the switch.

13. Logic for configuring an interface of a switch, the logic embodied in a non-transitory medium and operable to:
  send an authentication request from a switch to an authentication server, the authentication request requesting authentication for an endpoint, the switch comprising a plurality of interfaces and operable to access a plurality of templates, a template of the plurality of templates operable to generate one or more interface commands for an interface of the plurality of interfaces;
  receive a template identifier of a template identified by the authentication server as corresponding to an endpoint type of the endpoint, the template configured to be used to generate an interface command that allows the endpoint to use an interface of the switch;
  receive an instruction from the authentication server, the instruction instructing the switch to apply an identified template to an interface of the plurality of interfaces, the identified template identified by the authentication server as associated with the endpoint;
  insert, by the switch, an endpoint device identifier of the endpoint and an interface identifier of the interface into the template in response to the instruction from the authentication server in order to generate the command to allow the endpoint to use the interface, the endpoint device identifier comprising an endpoint IP address that uniquely identifies the endpoint, the endpoint device identifier identifying the endpoint type; and
  apply, by the switch, the identified template to configure the interface according to the instruction.

14. The logic of claim 13, further operable to apply the identified template to configure the interface by:

determining an interface command of the identified template; and
applying the interface command to the interface.

15. The logic of claim 13, further operable to apply the identified template to configure the interface by:
   identifying a variable of a template command of the identified template;
   establishing a value for the variable;
   inserting the value for the variable to yield an interface command; and
   applying the interface command to the interface.

16. The logic of claim 13, further operable to:
   detect a trigger event that triggers a next authentication request;
   send the next authentication request in response to detecting the trigger event; and
   apply a remove endpoint template to the interface in response to detecting the trigger event.

17. The logic of claim 13, further operable to:
   receive an instruction from the authentication server by receiving the instruction instructing the switch to apply the identified template comprising an add endpoint template, the add endpoint template operable to add the endpoint to the switch; and
   apply the identified template to configure the interface by adding the endpoint to the switch.

18. The logic of claim 13, further operable to:
   receive an instruction from the authentication server by receiving the instruction instructing the switch to apply the identified template comprising a remove endpoint template, the remove endpoint template operable to remove the endpoint from the switch; and
   apply the identified template to configure the interface by removing the endpoint from the switch.

19. A system for configuring an interface of a switch, comprising:
   means for sending an authentication request from a switch to an authentication server, the authentication request requesting authentication for an endpoint, the switch comprising a plurality of interfaces and operable to access a plurality of templates, a template of the plurality of templates operable to generate one or more interface commands for an interface of the plurality of interfaces;
   means for receiving a template identifier of a template identified by the authentication server as corresponding to an endpoint type of the endpoint, the template configured to be used to generate an interface command that allows the endpoint to use an interface of the switch;
   means for receiving an instruction from the authentication server, the instruction instructing the switch to apply an identified template to an interface of the plurality of interfaces, the identified template identified by the authentication server as associated with the endpoint;
   means for inserting, by the switch, an endpoint device identifier of the endpoint and an interface identifier of the interface into the template in response to the instruction from the authentication server in order to generate the command to allow the endpoint to use the interface, the endpoint device identifier comprising an endpoint IP address that uniquely identifies the endpoint, the endpoint device identifier identifying the endpoint type; and
   means for applying, by the switch, the identified template to configure the interface according to the instruction.

20. A method for configuring an interface of a switch, comprising:
   sending an authentication request from a switch to an authentication server, the authentication request requesting authentication for an endpoint, the switch comprising a plurality of templates and a plurality of interfaces, a template of the plurality of templates operable to generate one or more interface commands for an interface of the plurality of interfaces;
   receiving a template identifier of a template identified by the authentication server as corresponding to an endpoint type of the endpoint, the template configured to be used to generate an interface command that allows the endpoint to use an interface of the switch;
   receiving an instruction from the authentication server, the instruction instructing the switch to apply an identified template to an interface of the plurality of interfaces, the identified template identified by the authentication server as associated with the endpoint, the identified template comprising one of:
      an add endpoint template, the add endpoint template operable to add the endpoint to the switch; and
      a remove endpoint template, the remove endpoint template operable to remove the endpoint from the switch;
   inserting, by the switch, an endpoint device identifier of the endpoint and an interface identifier of the interface into the template in response to the instruction from the authentication server in order to generate the command to allow the endpoint to use the interface, the endpoint device identifier comprising an endpoint IP address that uniquely identifies the endpoint, the endpoint device identifier identifying the endpoint type;
   applying, by the switch, the identified template to configure the interface according to the instruction, the identified template applied to configure the interface by:
      identifying a variable of a template command of the identified template;
      establishing a value for the variable;
      inserting the value for the variable to yield an interface command; and
      applying the interface command to the interface, the identified template applied to configure the interface by performing one of the following:
      adding the endpoint to the switch; and
      removing the endpoint from the switch;
   detecting a trigger event that triggers a next authentication request;
   sending the next authentication request in response to detecting the trigger event; and
   applying the remove endpoint template to the interface in response to detecting the trigger event.

21. The method of claim 1, wherein applying, by the switch, the identified template to configure the interface to the instruction comprises configuring at least one port of the switch to establish a path between the endpoint and the switch.

22. The switch of claim 7, wherein the logic is operable to apply, by the switch, the identified template to configure the interface according to the instruction by:
   configuring at least one port of the switch to establish a path between the endpoint and the switch.

23. The logic of claim 13, further operable to apply, by the switch, the identified template to configure the interface according to the instruction by:
   configuring at least one port of the switch to establish a path between the endpoint and the switch.

24. The system of claim 19, wherein the means for applying, by the switch, the identified template comprises means for configuring at least one port of the switch to establish a path between the endpoint and the switch.

25. The method of claim 20, wherein adding the endpoint to the switch comprises configuring at least one port of the switch to establish a path between the endpoint and the switch.

* * * * *